(12) United States Patent
Hugas et al.

(10) Patent No.: US 7,068,798 B2
(45) Date of Patent: Jun. 27, 2006

(54) METHOD AND SYSTEM FOR SUPPRESSING ECHOES AND NOISES IN ENVIRONMENTS UNDER VARIABLE ACOUSTIC AND HIGHLY FEEDBACK CONDITIONS

(75) Inventors: Fernando Gallego Hugas, Tarragona Valls (ES); Eduardo Lleida Solano, Saragossa (ES); Enrique Masgrau Gomez, Saragossa (ES); Alfonso Ortega Gimenez, Saragossa (ES)

(73) Assignee: Lear Corp., Southfield, MI (US)

( * ) Notice: Subject to any disclaimer, the term of this patent is extended or adjusted under 35 U.S.C. 154(b) by 300 days.

(21) Appl. No.: 10/707,403

(22) Filed: Dec. 11, 2003

(65) Prior Publication Data
US 2005/0058278 A1    Mar. 17, 2005

(51) Int. Cl.
*H04B 15/00* (2006.01)
(52) U.S. Cl. ............................. 381/93; 381/94.1; 381/86
(58) Field of Classification Search .................... 381/83
See application file for complete search history.

(56) References Cited

U.S. PATENT DOCUMENTS

| | | | | |
|---|---|---|---|---|
| 4,490,584 A | * | 12/1984 | Lucey | 379/56.3 |
| 4,503,398 A | * | 3/1985 | Akram | 330/285 |
| 4,558,460 A | * | 12/1985 | Tanaka et al. | 381/86 |
| 5,533,120 A | * | 7/1996 | Staudacher | 381/93 |
| 5,768,398 A | * | 6/1998 | Janse et al. | 381/83 |
| 5,995,816 A | * | 11/1999 | Grayson et al. | 455/246.1 |
| 6,480,610 B1 | * | 11/2002 | Fang et al. | 381/321 |
| 6,496,581 B1 | * | 12/2002 | Finn et al. | 379/406.01 |
| 6,834,108 B1 | * | 12/2004 | Schmidt | 379/406.1 |

FOREIGN PATENT DOCUMENTS

WO    WO 9941897 A2 *    8/1999

* cited by examiner

*Primary Examiner*—Daniel Swerdlow
(74) *Attorney, Agent, or Firm*—Bruce E Harang (57) ABSTRACT

Method and system for canceling echoes and noises in environments with variable acoustic conditions and high feedback, such as the interior of an automotive vehicle, permitting audible communication between the occupants, comprising one/several microphone/s (1) for a speech signal (5) and A/D, D/A converters, amplification and filtering means generating an electric signal (13) reproduced as an acoustic signal (7) by a speaker (3), and an echo canceller (15) using said signal (13) and an electric signal (10) from the microphone integrating the feedback of said signal (7), another speech signal (5) and noise (9) seized by the microphone (1), the system (15) being applied to eliminating said feedback, the proposed method and system providing an additional filtering of an electric output signal (11) of the canceling device (15), after treatment of said signal, comprising a time variant filter that suppresses the residual acoustic echo not cancelled by the system (15) and the noise seized by said microphone/s (1).

5 Claims, 5 Drawing Sheets

METHOD AND SYSTEM FOR SUPPRESSING ECHOES AND NOISES IN ENVIRONMENTS UNDER VARIABLE ACOUSTIC AND HIGHLY FEEDBACK CONDITIONS

BACKGROUND OF INVENTION

1. Field of the Invention

The present invention refers to an overall communication method and system for vehicles, particularly automobiles, and which enables inside communication among the passengers of said vehicle at the same time it indistinctively permits any of the passengers to establish a call with the outside through a mobile telephone system integrated in the system itself.

Said inside communication among the passengers of a motorized vehicle is greatly obstructed by the presence of a high noise level in the interior of said vehicle, noise not only coming from the engine but also due to both the friction of the tires with the pavement and the wind. Furthermore, the location of the occupants is not usually the most suitable for maintaining a conversation since the passengers are not face to face, but rather people in the front part have their back turned to the occupants in the rear seats, and all this added to the distance between them, especially in those vehicles having three or more rows of seats, makes maintaining a conversation difficult. Likewise, the driver is occasionally obliged to take his eyes off the road in order to maintain a conversation and the passengers move or shift part of their body or members with regard to their seat positions, thereby altering the conditions of the acoustic environment inside the vehicle.

2. Background of the Invention

A problem occurring when installing a speech communication system, comprising microphones, amplifiers and speakers, in a closed area with limited volume and variable acoustic conditions (other variable noises also being present), such as the interior of an automated vehicle, the feedback phenomenon derivative occurs by adding sound signals emitted by the speakers and the environmental noise to the speech signals seized by the microphones close-by. To eliminate or limit the effects of such feedback, electronic circuits are used comprising digital filters associated to the amplifiers to filter the signal to be reproduced, greatly eliminating the echo effects.

Acoustic echo canceller systems applied to microphone and speaker assemblies are known in the state of the art, being possible to mention for this purpose patents EP-A-453293, EP-A-599450 and U.S. Pat. No. 5,245,665.

Patent application WO-A-98/56208 refers to a communication system especially designed for the cabin of an automated vehicle for the purpose of improving the clarity of spoken communication inside the closed area, comprising an echo canceller system for eliminating the feedback component.

Communication inside a vehicle implies an important challenge for acoustic echo control and for noise reduction. One or more microphones assembled in front of each passenger picks up the speech signal and, additionally, different noises from the engine, road or others. This signal is amplified and returned to the inside of the vehicle through the vehicle speaker system. This situation creates two main problems. First, as a consequence of the electro-acoustic coupling between the speakers and microphones, the entire system can become unstable with the bothersome effect of generating whistling. Secondly, as microphones pick up speech and noise, the overall noise level inside the automobile will increase. Therefore, an echo canceller system is necessary for preventing the system from electro-acoustically coupling and said system must also be capable of reducing the noise so as to prevent the noise level inside the vehicle from increasing or being reinforced.

In other words, said conditions pose some important demands for effective acoustic echo control and noise reduction. Acoustic echo control must prevent the entire system from electro-acoustically coupling and becoming unstable, with the additional problems that the system must enable always operating with two-way communication. Noise reduction must clean the signal of the microphone in order to prevent increasing or reinforcing the noise within the vehicle.

Acoustic echo cancellation is carried out by means of an adaptive digital filter or set of filters operating parallely with the microphone and speaker system in the interior of the vehicle. For proper functioning of said filter, the single presence of the echo signal is required, but, given the nature of the acoustic environment, the microphone seizes, in addition to said echo signal, the near-by speech signal and environmental noise, which can lead to a permanent interference of the adaptive filter. The acoustic echo is produced by the speech signal near the microphone, such that the echo canceller must always deal with the echo and with said near-by speech signal.

A known solution for this drawback proposes freezing the echo canceller carried out in the form of an adaptive digital filter, such as a FIR (Finite Impulse Response) filter whose coefficients are updated by using a standardized LMS (Least Mean Square) algorithm when conditions are detected that are susceptible to generating whistling due to coupling, according to that proposed in patent U.S. Pat. No. 5,706,344. However, due to the continuous changes in the conditions of the communication paths between the occupants and microphone-speaker assemblies, the system can become unstable and begin to generate whistling while the passengers are talking and/or gesticulating. Said latter patent also proposes adding a low level white noise in the form of a random signal suitable for identifying the communication path when there is no signal in the proximity of the microphone and aids filter stability. However, this low level white noise may bother passengers if they are next to the speakers, a condition which is practically unavoidable in the interior of a vehicle.

The system and method according to the invention make no use of any freezing of the acoustic echo canceller, nor does it use low level white noise.

SUMMARY OF INVENTION

In order to lessen the drawbacks explained above in the state of the art, as per the method and system according to the present invention, it is proposed to carry out a treatment of the electric signal after leaving the acoustic echo canceller consisting of an additional time variant filtering, applied so as to reduce the noise existing inside of the vehicle which is seized by the microphones and the residual acoustic echo or echo tail that is not cancelled, also present in said signal.

According to the present invention, the conversation of each one of the vehicle occupants is picked up by means of a microphone assembly, suitably amplified and filtered in order to then return it to the inside of the vehicle through the speaker system thereof and in the suitable place, in other words, the conversation between the front occupants of the vehicle will be reproduced in the speakers in the rear part, whereas the conversation between occupants in the rear part will be reproduced by the front speakers.

Furthermore, and given that the use of cellular telephones by the driver of a vehicle while driving is prohibited by current legislation in many jurisdictions, the only means permitted being that of using speaker phones, the system according to the invention implements a speaker phone system with the support of a mobile telephone permitting the establishment of a telephone call to the outside, not only for the driver of the vehicle but rather for each and every one of its occupants.

The system according to the invention, in addition to the aforementioned uses, also permits recording and subsequently reproducing a voice message.

The acoustic echo canceller system used comprises several adaptive digital filters using a standardized LMS algorithm for updating the filter coefficients (like those referred to in said patents) whose values are adjusted according to the transfer function between each output channel or speaker and each input channel or microphone, such that the output-input feedback is cancelled through these transfer functions.

According to the invention, said additional time variant filtering is carried out by means of a two-step Wiener filter that tries to attain two objectives:—the elimination of echo remains (residual echo suppressor) remaining after the signal of each microphone passes through the echo canceller, and—the reduction of the noise level present in the interior of the vehicle so that this noise seized by the microphones is not amplified by the system and again returned to the inside of the vehicle at a higher volume.

The noise and residual echo suppressor block is based on the theory of optimal linear filtering, such that the filter $W_{opt}(e^{jw})$ is designed with the object of eliminating from the input signal those spectral components originating from the environmental noise present in the interior of the vehicle and those other residual echo components remaining after the acoustic echo canceller, keeping the desired speech signal intact.

According to the theory, the optimal Wiener filter capable of minimizing the mean-square error ($E[e^2(n)]$), defining the error as the difference between a desired signal $d(n)$ and the output signal of the optimal Wiener filter, is that which responds to the expression:

$$W_{opt}(e^{jw}) = S_{dx}(e^{jw})/S_{xx}(e^{jw})$$

where $W_{opt}(e^{jw})$ is the optimal Wiener filter frequency response, $S_{dx}(e^{jw})$ denotes the cross spectral power density between the desired signal $d(n)$ and the input signal to the filter $x(n)$ and $S_{xx}(e^{jw})$ is the spectral power density of the input signal to the filter $x(n)$.

If it is assumed that the input signal to the filter, as occurs in the present case, is formed, on one hand, by the desired signal $d(n)$ and on the other, by a interference $m(n)$, in other words, $x(n)=d(n)+m(n)$, and if, as also occurs on this occasion, one or both processes are null average, the expression of the optimal feature is in the following form:

$$W_{opt}(e^{jw}) = S_{dd}(e^{jw})/S_{xx}(e^{jw})$$

Since $S_{dx}(e^{jw})$ is the Fourier transform of the cross correlation function between the desired signal and the signal $x(n)$ defined as $r_{dx}(k)=E[d(n)\cdot x(n-k)]$ (for real signals that it operates with). If $x(n)=d(n)+m(n)$, $r_{dx}(k)=E[d(n)\cdot d(n-k)]+E[d(n)\cdot m(n)]$ and the second term of the sum is null if non-correlation and null average are assumed, $r_{dx}(k)=E[d(n)\cdot d(n-k)]=r_{dd}(k)$ therefore remaining, $r_{dd}(k)$ being the autocorrelation function of the desired signal.

The noise reduction and residual echo filter calculation according to that proposed in the present invention is carried out in the frequency domain by means of the spectral power density estimate of the noise and the spectral power density estimate of the residual echo in order to, depending on these two measurements plus the spectral power density of the input signal, find that response for the filter which obtains cleaning the noise and residual echo from the input signal.

Other features and details of the method and system according to the invention will be described with reference to several attached drawings, which must be considered illustrative and non-limiting, according to the following detail:

BRIEF DESCRIPTION OF DRAWINGS

The invention will be better understood with the following detailed description of several embodiment examples with reference to the attached drawings, in which.

DETAILED DESCRIPTION

Figure 1:
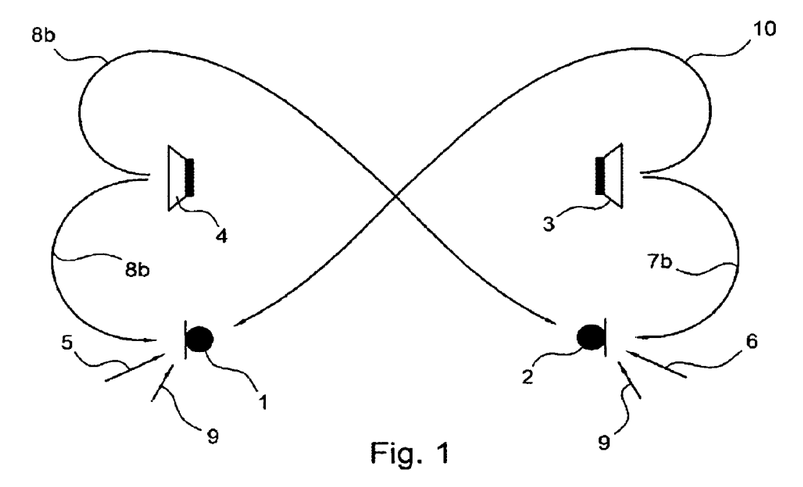
FIG. 1 shows a schematic diagram showing the echo generating feedback phenomenon occurring in a closed area with near-by microphones and speakers.

In reference first to FIG. 1, two microphones 1, 2 and two speakers 3, 4 assembled in a limited space are shown, such as in the interior of an automobile for example, where said speakers 3, 4 are the speakers of a conventional music equipment of the vehicle, each one being located near one or more vehicle passenger seats, and said microphones 1, 2 are strategically located (advantageously near the head of each passenger) in order to suitably and separately seize the voices of said passengers in the form of speech signals 5, 6.

Each one of the microphones 1, 2 receives a respective speech signal 5, 6 and converts it, by means of an amplification and filtering system (including an A/D and D/A or CODEC conversion assembly), into electric signals which are sent to the speakers 3, 4, which transform them into respective reproduced acoustic signals 7a, 7b; 8a, 8b. Then, the microphones 1,2 receive, in addition to the speech signals 5, 6 emitted in their vicinity, said acoustic signals 7a, 7b; 8a, 8b reproduced by the speakers 3, 4 and several environmental noise signals 9 (generated by very different sources such as the engine, friction with the road, wind, etc). Thus, for example, a first microphone 1 preferably receives the speech signal 5 of the passenger closest to it, the acoustic signal 8a reproduced by the closest speaker 4, in a less accentuated manner, the acoustic signal 7a reproduced by the farthest speaker 3 in a more attenuated manner and, lastly, the environmental noise signal 9, which can greatly vary, depending on factors such as vehicle speed or the existence of windows that are open in a greater or lesser degree. The microphone 2 likewise receives signals 6, 8b, 7b and 9. It is necessary to take into account that the speakers 3, 4 could be emitting music or voices reproduced by said music equipment of the vehicle, either from a radio, cassette or compact disc source, which can also be seized by the microphones 1, 2.

This entire aforementioned set of sound signals seized by the microphones 1, 2 are amplified by conventional electronic means, reproduced by speakers 3, 4 and seized again by the microphones 1, 2 with greater intensity and so on, successively, generating a feedback effect producing an unwanted echo, which can make the speech signals that are intended to be amplified incomprehensible or destabilize the system, generating coupling whistling that is bothersome to the ear.

To prevent this drawback in a system in which a filter or set of adaptive digital filters for echo cancellation is used, according to the conventional art, for example, that disclosed in said background, applied to the acoustic signals seized by the microphones 1, 2, it is proposed, according to the present invention, to also carry out a further filtering of the outgoing electric signal of the echo canceller for the purpose of eliminating echo tails or residual echo and to reduce or eliminate environmental noise, such that said feedback effect if very effectively counteracted.

Figure 2:
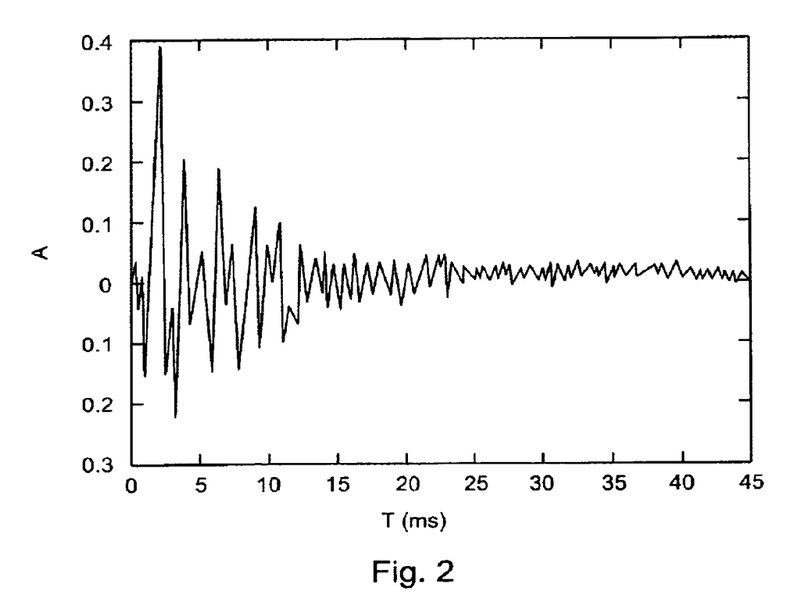
FIG. 2 shows a graph showing a typical impulse response of the interior of a conventional vehicle where an area is indicated that is eliminated by an adaptive echo canceller filter, and a residual tail or remaining interference, since the filter length is necessarily limited.

FIG. 2 is a graph of a signal corresponding to the impulse response of the interior of a conventional vehicle. The amplitude A of said signal is decreasing with time t and its length can vary. To completely eliminate the echo produced by this impulse response, an adaptive digital filter is required that is capable of covering all the possible impulse response lengths, but this would imply a long processing time, generally incompatible with that which is available, in addition to an increase in the complexity of the digital filter or set of filters and the corresponding costs. As a result, even though the digital filter or set of adaptive filers used achieves the attenuation of the part in which said signal has more amplitude (indicated by a segment ending in arrows on the abscissa axis), said echo tail, or remaining residual part, together with the environmental noise, still constitutes an important interfering element for the system.

Figure 3:
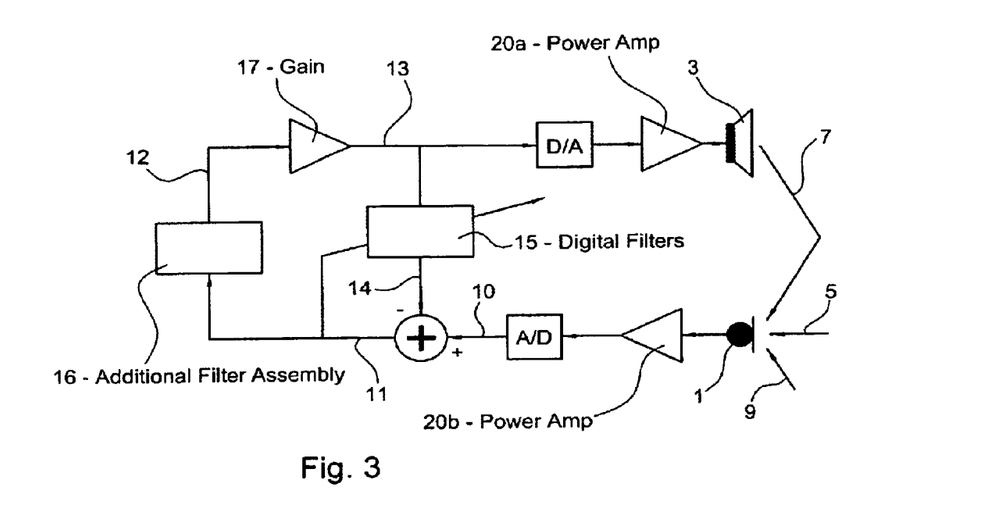
FIG. 3 shows a schematic diagram of a first simplified manner of implementing the system of the invention with a single channel comprising a microphone and a speaker.

The diagram in FIG. 3 shows a basic manner of implementing the system of the present invention, which, for greater simplicity, has been reduced to a single microphone 1 and a single speaker 3. In this example, the microphone 1 seizes the speech signal 5 of a passenger, the acoustic signal 7 reproduced by the speaker 3 and a noise signal generically indicated with the reference 9. This set of signals is converted by the microphone 1 (which has a pre-amplifier 20b and an A/D converter associated to it) into an electric signal 10 from which a signal 14 is extracted originating from a digital filter or a set of echo canceller digital filters 15 (heretofore referred to as echo canceller, with conventional structure and functioning) to form a signal 11, which furthermore passes through a block 16, according to a first aspect of this invention, which represents an additional echo tail and environmental noise canceller filtering assembly (whose functioning is explained below) eliminating the part of the electric signal 11 corresponding to the residual echo and the noise 9 close to the microphone 1. The output signal 12 of the block 16 is amplified by a gain factor 17 and the resulting amplified signal 13 is sent to the speaker 3 for the reproduction thereof after passing through a D/A converter and power amplifier 20a. Then said amplified digital signal 13 is also sent to the echo canceller 15 to which said signal 11 is also sent. The echo canceller uses said amplified digital electric signal 13, which will be reproduced by the speaker 3 and the signal 11 containing information on the error committed in the identification of the transfer function between speaker 3 and microphone 1.

Figure 4:
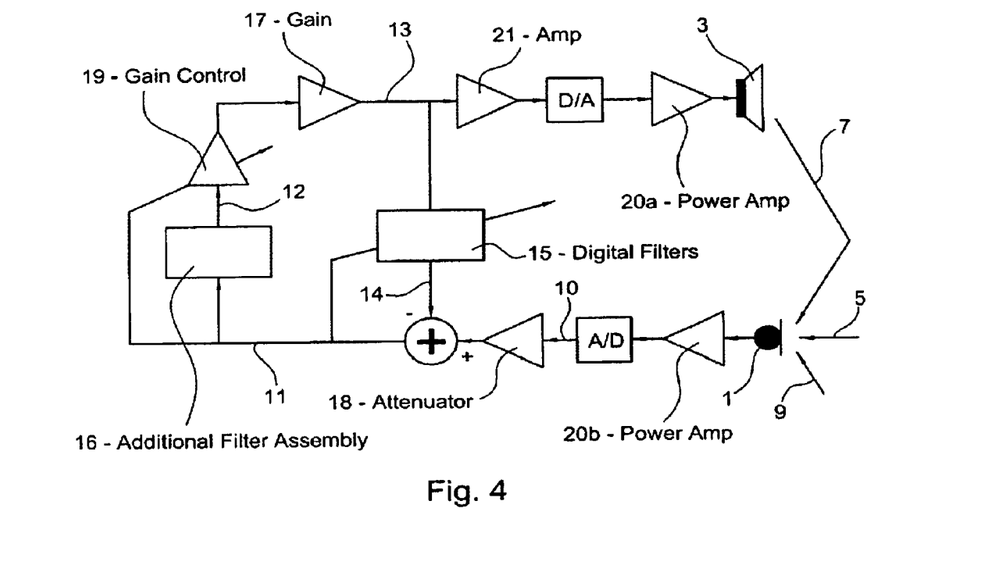
FIG. 4 shows a schematic diagram of a more complete manner of implementing the system of the invention including an attenuation of the input signal seized by the microphone and a differentiation in blocks of the different gain stages.

FIG. 4 shows a preferred, more complete implementation of the system of the present invention which, like in the example in FIG. 3, comprises a microphone 1 and speaker 3 connected to a circuit including an amplification gain 20b, A/D, D/A converters, an echo canceller 15, a noise and echo tail canceller block 16 and a power amplifier gain 20a. However, here, according to a second aspect of the invention, a final volume control device of the system is included which is determined by a series of gain factors through which the signal seized by the microphone 1 passes. These gain factors include an attenuator 18 of the input signal to the circuit (affecting the set of signals seized by the microphone), an automatic gain control 19 placed after the echo tail and noise canceller filter 16, followed by another gain 17 controlled by the user and an amplifier 21 after the point from where the signal 13 is derived towards the echo canceller filter 15 and before said power amplifier gain 20a. The produce of the gain factors 18 and 21 is 1 and permits decreasing an adaptive algorithm excess controlling the echo canceller 15 by attenuating the input signal 10. On the other hand, the output signal 13 is amplified by the amplifier 21 compensating the attenuation caused by the attenuator 18, before passing through the power amplifier 20a to be sent to the speaker 3.

According to a third aspect of the invention, the automatic gain control 19 keeps the output signal 12 of the Wiener filter at a constant level to prevent saturations and, against the presence of a possible instability of the system generating an uncontrolled increase of the signal 11 level, automatically attenuates the signal 12 and, when necessary, acts on the filters 15 and 16 to stabilize the system.

Figure 5:
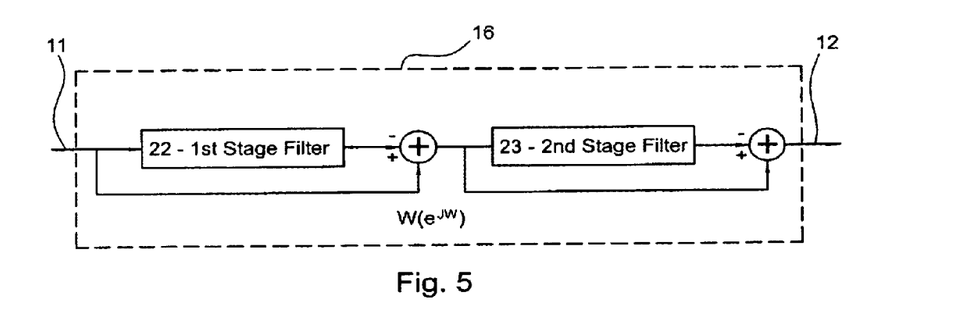
FIG. 5 shows an illustrative detail of the filter used in the circuit in FIGS. 3 and 4, according to the invention, which comprises two stages, one for canceling said residual echo and the other for eliminating environmental noise.

FIG. 5 shows a preferred construction (calculation) scheme of the filter 16 for echo tail control and noise reduction used in the circuits in the previous schemes 3 and 4 according to the invention. This filter comprises first and second stages 22, 23. The first stage 22 is intended to obtain the optimal frequency response of a linear filter which is able to obtain from the input signal 11 those echo components which have not been eliminated by the echo canceller structure composed of the adaptive filters 15, whereas the second stage 23 is intended to obtain the response of a filter capable of estimating the part of the signal corresponding to the environmental noise 9 seized by the microphone 1 and which is also present in said electric input signal 11 to this additional filter 16.

The process through which the residual echo and noise suppressor filter is obtained, $W(e^{jw})$, is divided into two phases since, for the final filter calculation, $W(e^{jw})$ is broken down into said two stages 22 and 23 arranged in cascade.

To obtain the frequency responses for both filters or filtering stages 22, 23, the spectral power density estimates part from the input signal 11 to the Wiener filter ($S_e(e^{jw})$), from the residual echo ($S_r(e^{jw})$), from said input signal 11, now lacking residual echo ($S_{r_e}(e^{jw})$) after passing through stage 22, and from the noise ($S_n(e^{jw})$). So the response of the first filter is that which fits the expression:

$$H_e(e^{jw}) = S_r(e^{jw})/S_e(e^{jw})$$

In this manner, $H_e(e^{jw})$ will place its passing bands in those regions in which the echo predominates over the signal (quotient of approximately 1) and its attenuating bands in those others in which the signal predominates over the echo (quotient of approximately 0). Thus calculated, $H_e(e^{jw})$ will permit obtaining the residual echo spectrum at its output, such that this spectrum could be subtracted from that of the input signal to obtain the input signal spectrum without residual echo ($S_y(e^{jw})$).

With the second filter 23, it will be possible to act in the same manner and obtain the frequency response thereof:

$$H_n(e^{jw}) = S_n(e^{jw})/S_y(e^{jw})$$

Thus, this filter will let those bands pass in which noise prevails over the signal and will attenuate those others in which there is a higher signal content than noise. Once the frequency responses of the two filters have been obtained, the transfer function of the diagram in FIG. 2 can be obtained as:

$$W(e^{jw}) = (1 - H_e(e^{jw}))(1 - H_n(e^{jw}))$$

since the filters are arranged in cascade.

The reverse Fourier transform is subsequently carried out in order to obtain the filter impulse response w(n) with which the echo canceller output signal 11 will be subsequently filtered.

Figure 6:
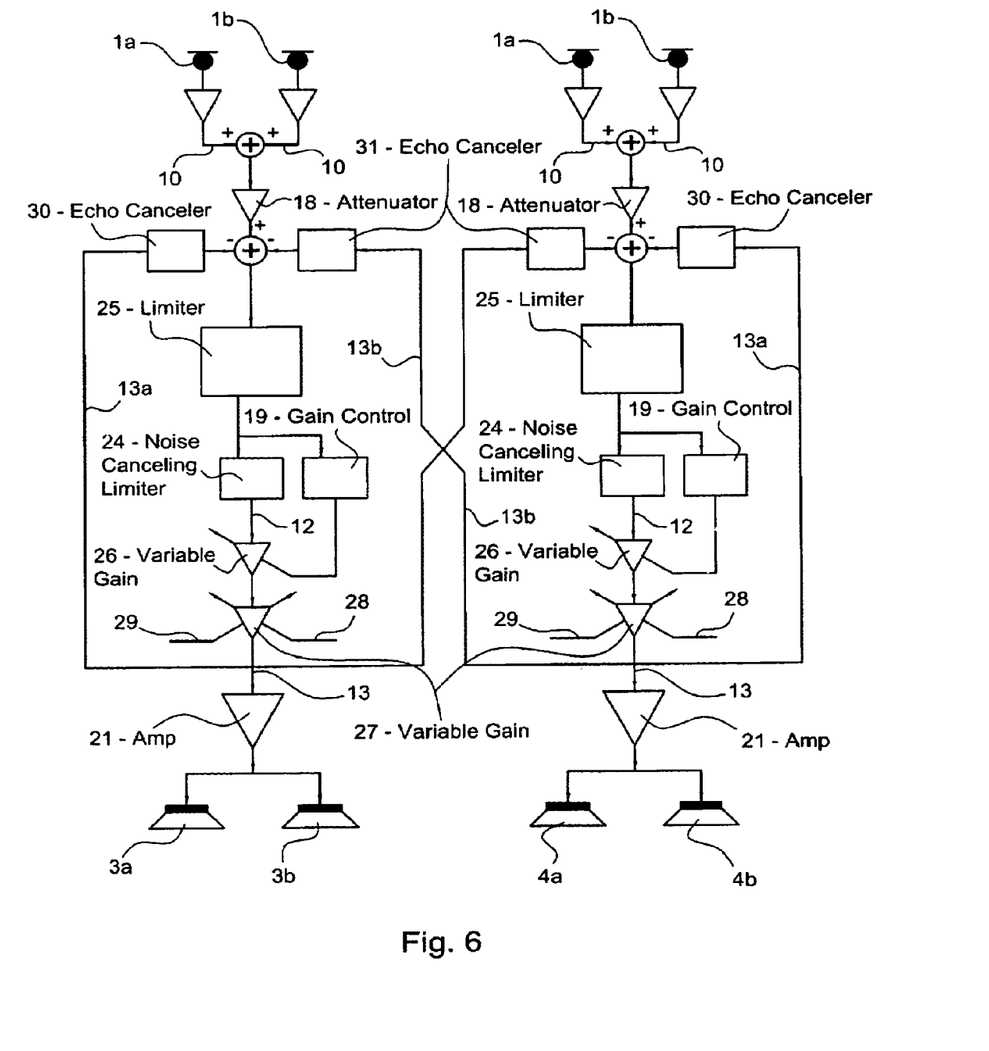
FIG. 6 shows a schematic diagram of an implementation of the system of the invention comprising four microphones and four speakers distributed between the front and rear areas which could correspond to the four seats in a conventional touring automobile.

Although the schemes in FIGS. 3 and 4 show the system of the invention applied to a single microphone and a single speaker, it can be implemented for an undetermined number of microphones and speakers. FIG. 6 shows a general scheme of the system of the invention applied to the cabin of an automobile with four seats, a microphone 1a, 1b, 2a, 2b and a speaker 3a, 3b, 4a, 4b (using the same numerical references for those equivalent components or blocks) corresponding to each one of them.

In the scheme in FIG. 6, the input signals 10 of two of the microphones 1a, 1b (corresponding, for example, to the left and right front seats) are joined in a single signal that is sent to an echo tail and noise canceller filter 24 (equivalent to block 15 in FIGS. 3 and 4, with known structure and functioning), previously passing through an attenuator 18 and a limiter 25 (for preventing saturations). At a point between the limiter 25 and echo and noise filter 24, there is a bypass passing through an automatic gain control 19 regulating the output signal 12 of the noise and echo filter 24 in a variable gain 26. Another variable gain 27 regulates the output signal level depending on a signal 28 originating from several volume control buttons available to the users (not shown) and on a signal 29 proportional to the vehicle speed supplied by the vehicle's electronic system. Finally, the output signal 13 is amplified by a gain 21 (compensating said attenuation stage 18) to be finally sent to the speakers 3a, 3b (located, for example, to the left and right of the rear seats) for the acoustic reproduction thereof.

The signals of the other two microphones 2a, 2b (corresponding, for example, to the left and right rear seats) follow, for their part, the same path in an analogous circuit until being acoustically reproduced by corresponding speakers 4a, 4b (located, for example, to the left and right of the front seats). However, both circuits are not independent from one another, but rather they are related such that the signal of each one influences the signal of the other. Thus, in each circuit, the output signal 13 takes a first bypass 13a before being amplified by the compensator block 21 of the attenuation block 18, bypass that is filtered in a first echo canceller 30 (by means of an adaptive digital filter, according to that explained) and subsequently extracted from the attenuated input signal at the output of the attenuator 18 of the circuit. On the other hand, at the same point of the output signal 13, a second bypass 13b is taken in each circuit, which is sent to an echo canceller 31 of the remote circuit and, once filtered, is extracted from the attenuated input signal at the output of the attenuator 18 of said remote circuit, at the same point where signal 13 of the echo canceller 30 of the circuit is extracted.

Figure 7:
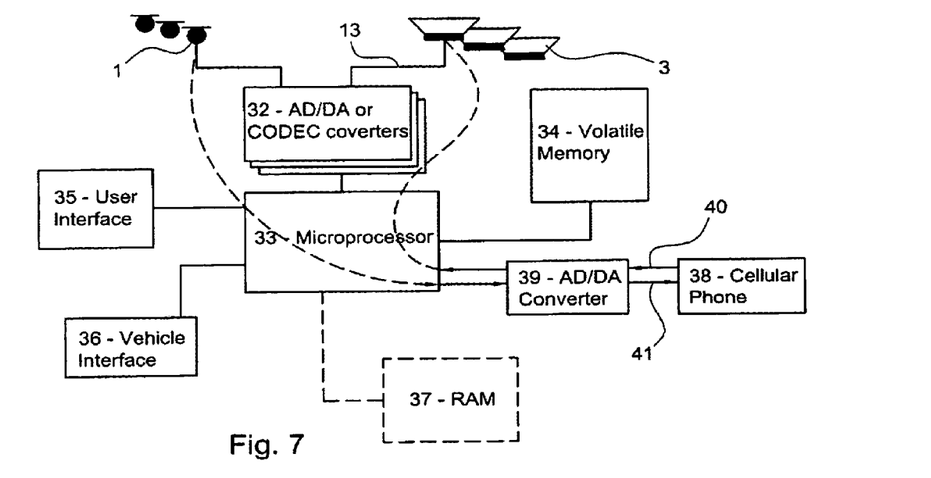
FIG. 7 shows a schematic diagram of the control and management elements used in the system of the invention comprising several microphones, several speakers and a speaker phone channel for a mobile cellular telephone susceptible to being used by any one of the vehicle occupants.

In FIG. 7, an undetermined number of microphones 1 and an undetermined number of speakers 3 are connected through several corresponding analog digital and digital analog converters (or CODECS) 32, with at least one microprocessor 33 controlling the echo and noise canceller system according to the principles of the present invention, applicable in the interior of an automated vehicle. Said microprocessor 33 is connected to a volatile memory 34, a user interface 35 including, for example, several control buttons available to the passengers, and a vehicle interface 36 receiving data about the vehicle's operating conditions such as driving speed, opened or closed state of the windows, etc., which influence the acoustic environmental noise level in the interior of the vehicle. The system optionally includes a random access external memory 37. A cellular mobile telephone 38 is susceptible to being connected (by means of wiring, for example) to the microprocessor 33 through a corresponding analog digital and digital analog converter 39. The output signal 40 originating from said cellular mobile telephone 38 is amplified, sent to the speakers 3 distributed inside the vehicle for the acoustic reproduction thereof, such that it is clearly audible for all the occupants in the vehicle. On the other hand, any of said occupants can freely speak and their voice, seized by the corresponding microphone 1, is treated by the system and sent as an input signal 41 to the cellular mobile telephone 38. Thus, the system of the present invention acts as a speakerphone device which enables a telephone conversation with the outside, not only for the driver of the vehicle to another of its occupants but also real multiple conversations between all the occupants and the outside. Furthermore, both the acoustic signal 13 reproduced by the speakers 3 and the electric signal 41 sent to the cellular mobile telephone 38 are duly filtered by the system and, therefore, free of echoes and noises.

In an embodiment example, said user interface 35 comprises, typically available to the driver, a system connect/disconnect button, a reproduction volume increase button, a reproduction volume decrease button, a button which permits recording a voice message, a button which permits reproducing a previously recorded voice message and a button to enable/disable the microphones of the occupants in the case of a telephone conversation with the outside.

It is well known that the sound noise level inside a vehicle increases as the driving speed thereof increases. This sound level is due to the noise from the engine, the friction of the car body with the air and the friction of the tires with the pavement. According to that explained (block 19 in FIG. 3 or block 27 in FIG. 6), the system of the present invention has an automatic volume control depending on the vehicle speed in order to adjust the acoustic reproduction volume of the speakers to the sound noise level present in the interior at all times.

Figure 8:
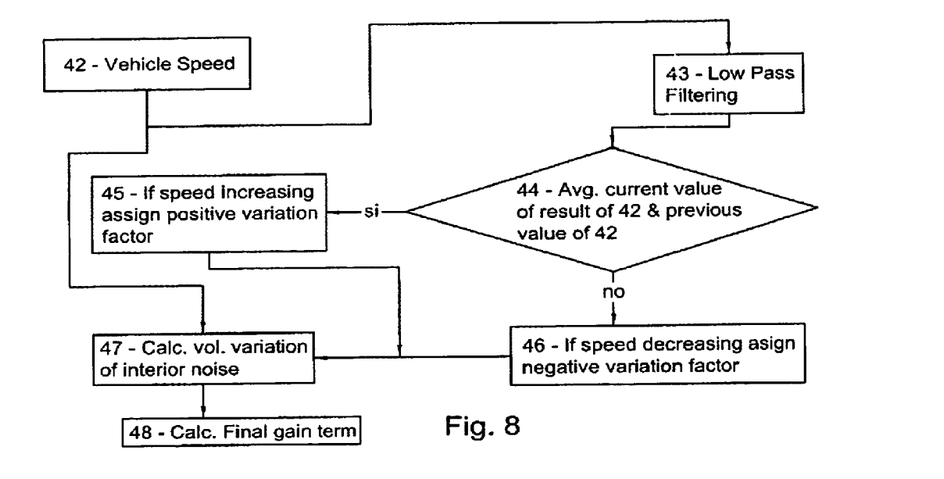
FIG. 8 shows an illustrative flow chart of an algorithm used in the system of the invention for automatically controlling the speaker volume depending on the speed of the vehicle.

The flow chart in FIG. 8 schematically shows a descriptive algorithm of said automatic volume control depending on the vehicle speed in the echo tail and environmental noise canceller system of the invention. Block 42 provides a value reader of the real speed of the vehicle in a given moment, value which is supplied by the vehicle's electronic control system. In stage 43, a low pass filtering is carried out on the signal of the speed value reader before going on to stage 44, which comprises carrying out an average between the speed read in stage 42 and the immediately previous speed to determine the speed variation degree and if said variation is increasing or decreasing. If the determination result of stage 44 is increasing speed, stage 45 assigns a positive speed variation factor, and if it was determined that the speed is decreasing, step 46 assigns a negative speed variation factor. Immediately following, stage 47 carries out the calculation of the volume variation to be applied to the system for compensating the sound noise level alterations inside the vehicle produced by the driving speed variations of the vehicle. This calculation comprises multiplying the speed value read in stage 42 by the variation factor obtained in stages 45 or 46. The final gain term actually applied to the system is the product of a time weighted average between the current volume variation value, obtained in stage 47, and the immediately previous volume variation value. This value obtains that the volume changes are not instantaneous, in other words, abrupt, but that they are gradual, which is more pleasant for the users and more favorable for system stability. The volume variation obtained by this system is set by both a minimum value when the vehicle is stopped and for a maximum value when the vehicle speed exceeds a certain speed, to be defined.

It has also been foreseen that the system also include an automatic amplification gain control stage of the electric output signals 12 of the system 16 after carrying out said additional filtering of echo tails and environmental noise, automatically controlled depending on the signal 11 level at the output of the echo canceller 15, preventing the saturation of the system against instabilities thereof.

Figure 9:
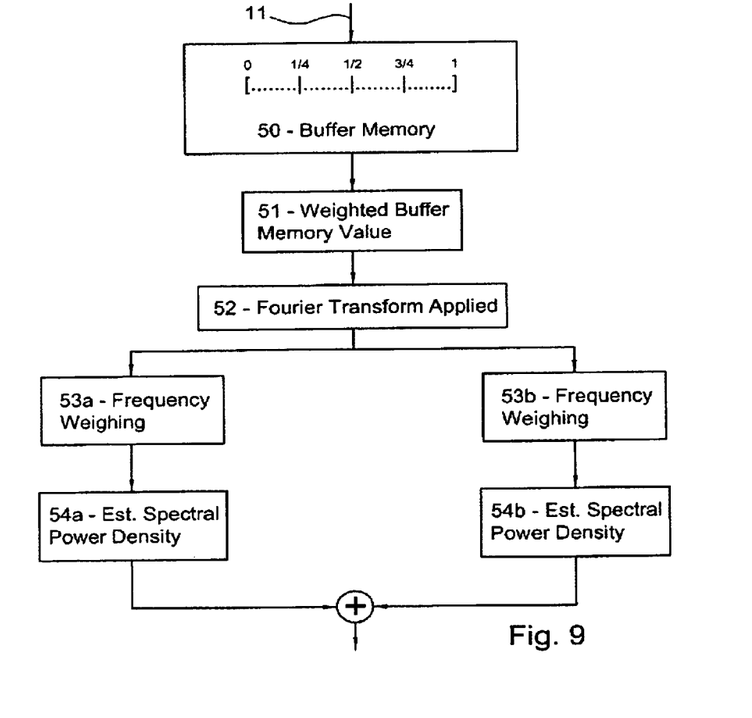
FIG. 9 shows a scheme illustrating an embodiment example for the spectral power density estimate of the signals intervening in the process, according to the principles proposed in this invention.

FIG. 9 shows a possible preferred method for the spectral power density estimates of the signals to be processed.

As previously indicated, the calculation of the frequency response of the combined noise reduction and echo tail control filter (shown in FIG. 5) is based on spectral power density estimates of the signals intervening in the process. Since said signals intervening in the process are non-stationary signals, the spectral power density estimate is regularly updated every M samples of the input signal 11. These estimates are carried out in the frequency domain following the scheme in FIG. 9. For each M samples of the input signal 11, a filter frequency response estimate is carried out for which said M samples and the previous (L−1) M samples are used, composing a total of LM samples stored in an intermediate or buffer memory 50. The maximum value of M is accepted by the maximum delay permitted for auditory integration, in the passenger's ear, between the sound received directly from the calling party and the reinforcement provided by the system of the invention. Once the buffer 50 contains the LM samples, they will be weighed through a window in block 51, and a fast Fourier transform is applied to the LM samples in block 52. To reduce the variation of the spectral power densities estimate, and in this manner reduce the probability of musical noise occurrence (a noise typically added by this type of noise canceling filters), the input signal 11 spectrum is smoothed out by means of a smoothing following a MEL-type frequency weighting (frequency perception scale). Blocks 54a and 54b estimate the spectral power density of the input signal $S_e(e^{j\omega})$. Once the spectral density of the input signal is obtained, an estimate of the filters is obtained with the obtained spectral power density and the previous spectral power density estimates of the residual echo and of noise, as such:

$$H_e(e^{j\omega}) = S_r(e^{j\omega})/S_e(e^{j\omega})$$

$$H_n(e^{j\omega}) = S_n(e^{j\omega})/S_y(e^{j\omega})$$

Since the filters are calculated from estimates, to prevent the latter from taking on excessively high values in those frequencies in which the spectral power density estimates of the denominators have taken on values close to zero, a limit is placed that is lower than the spectral power density estimates intervening in the previous expressions as denominators, in this manner:

$$H_e(e^{j\omega}) = S_r(e^{j\omega})/\max(S_e(e^{j\omega}), \epsilon)$$

$$H_n(e^{j\omega}) = S_n(e^{j\omega})/\max(S_y(e^{j\omega}), \epsilon)$$

where $\epsilon$ is the lower limit assigned to them.

In the same manner, the estimates of the numerator can occasionally take on very high values, therefore the resulting filter value obtained places a higher limit.

$$H_e(e^{j\omega}) = \min(S_r(e^{j\omega})/\max(S_e(e^{j\omega}), \epsilon), h\max)$$

$$H_n(e^{j\omega}) = \min(S_n(e^{j\omega})/\max(S_y(e^{j\omega}), \epsilon), h\max)$$

Immediately following, a temporary smoothing of the filters is carried out to prevent excessively fast variations in them.

$$H_e(e^{j\omega}) = \alpha H_e(e^{j\omega}) + (1-\alpha) H_e(e^{j\omega})\text{prev}$$

$$H_n(e^{j\omega}) = \alpha H_n(e^{j\omega}) + (1-\alpha) H_n(e^{j\omega})\text{prev}$$

Lastly, a new frequency smoothing of the filters is carried out by means of a Mel filter to reduce the estimate variation and those bands are set to 1 in which there is no speech signal and therefore there can be no signal at the filter output, specifically, the total resulting filter is forced to have the lowest and the highest frequency band as eliminated bands.

From the previously calculated filters, the re-estimate is carried out for the rest of the spectral power densities according to the following expressions.

$$S_y(k+1, e^{j\omega}) = 0.9 \cdot S_y(k, e^{j\omega}) + 0.1 \cdot \{1 - [(1-\delta) + \delta \cdot H_e(k, e^{j\omega})]^2\} \cdot S_e(k, e^{j\omega})$$

$$S_r(k+1, e^{j\omega}) = (1-\beta_e) \cdot S_r(k, e^{j\omega}) + \beta_e \cdot [(1-\delta) + \delta \cdot H_e(k, e^{j\omega})]^2 \cdot S_e(k, e^{j\omega})$$

$$S_n(k+1, e^{j\omega}) = (1-\beta_r) \cdot S_n(k, e^{j\omega}) + \beta_r \cdot [(1-\delta) + \delta \cdot H_r(k, e^{j\omega})]^2 \cdot S_y(k, e^{j\omega})$$

where the k index indicates the instant in time.

If the echo and noise estimating filters were perfect, it is known that the spectral power densities of residual echo and noise would be, respectively:

$$S_r(e^{j\omega}) = S_e(e^{j\omega})|H_e(e^{j\omega})|^2$$

$$S_n(e^{j\omega}) = S_y(e^{j\omega})|H_n(e^{j\omega})|$$

However, as the filter estimates depend on the spectral density estimates, a biased spectral power density estimate must be carried out. This biased estimate introduces the δ parameter permitting a portion (1−δ) of the spectral power density of the input signal to always be in the spectral power density estimate of the residual echo or of noise. On the other hand, and attending to the stationary or non-stationary nature of the signals that are to be canceled, the spectral power density estimate is averaged in time with the β parameters. In the case of noise cancellation, and assuming that noise is much more stationary than the speech signal, $β_r$ it takes on very small values, approximately 0.005, which imply a long time averaging window. However, the residual echo has a statistic that is similar to speech with which the time averaging window must be short, which implies using large values for $β_e$, approximately 0.5.

The spectral power density of the signal without residual echo ($S_y(e^{j\omega})$), since it is an estimate as from the also estimated residual echo canceller filter output, has been averaged in time so as to reduce the possible fluctuations in the estimate due to the variance of the estimator.

The essential features of the method and system according to the invention are detailed in the following claims.

The invention claimed is:

1. Method for canceling echoes and noises in environments with variable acoustic conditions and high feedback inside a vehicle for the purpose of permitting the establishment of a clear audible communication between the occupants of the different areas of said vehicle, the method comprising:

receiving an existing original speech signal (5) in at least a first microphone (1) located in a first site;

generating an electric signal from said original speech signal using an assembly comprising several A/D-D/A converters, amplifiers and filters;

receiving said electric signal in at least one speaker (3) to transform said electric signal (13) into an acoustic signal (7) susceptible to being received by said first microphone (1) together with a new original speech signal (5) and noise (9), said new original speech signal and noise existing near said first site;

removing feedback by applying an operative acoustic echo canceller system (15) using said electric signal (13) which will be reproduced, and an electric signal (10) supplied by the microphone and A/D converter means, the signal (10) comprising the feedback of said reproduced acoustic signal (7), a new existing, original speech signal (5) and a noise (9) seized by the microphone; and carrying out additional filtering of an electric output signal (11) of said acoustic echo canceller system (15), resulting from the treatment of said signal (10) sent by the microphone (1), the additional filtering comprising a two-stage Wiener filter (16), coupled in cascade, a first of them (22) applied to the elimination of a possible residual echo not suppressed by the echo canceller system (15) and a second stage (23) intended to suppress the noise components (9) of the interior present in said signal (11), the calculation of the frequency response of both stages (22, 23) being carried out by a spectral power density estimate of said residual echo and by a spectral power density estimate of said noise present in said signal (11).

2. Method according to claim 1, characterized in that said power density estimate of the residual echo and the spectral power density estimate of said noise (9) existing in said signal (11) comprise the following stages:

storing M number of samples of said input signal (11) in a buffer memory (50), together with an M number (L−1) of samples of the same in a previous instant, ordered from the oldest to the most recent, the number M being set by the maximum permitted delay for auditory integration, in the passenger's ear, between the sound received directly from the calling party and the reinforcement provided by the communication system;

weighting said LM samples in a window (51);

applying a fast Fourier transform in a stage (52), and smoothing the spectrum of said input signal (11) by means of a smoothing following a MEL type frequency weighting of the real and imaginary parts in respective phases (53a), (53b) so as to reduce the estimate variance from whose real and imaginary parts said spectral power density of the input signal (11) to the Wiener filter (16) is estimated.

3. Method according to claim 1, characterized in that in the case of weighting the samples of the residual echo signal, the averaging time window (51) is short, whereas a long averaging time window is used for weighting the samples of the noise signal, which are more stationary than the speech signal.

4. Method according to claim 1, characterized in that by carrying out an initial attenuation phase (18) of the input signals (5, 7, 9) to each microphone (1) that are compensated with a proportional amplification stage (21) of the electric signal (13) sent to the corresponding speaker (3) for its reproduction after the suitable filtering and cancellation of echo tails and noises in said Wiener filter (16).

5. System for canceling echoes and environmental noises with variable acoustic conditions and high feedback, in the interior of a vehicle, permitting the establishment of a clear, audible communication between the occupants of different areas of said vehicle, which comprises:

at least a first microphone (1) in a first site, susceptible to receiving an existing original speech signal (5), and to convert it into an electric signal (13) using an assembly comprising several A/D-D/A converters, amplifiers and filters; and at least one speaker (3) for receiving said electric signal (13) and to convert it into an acoustic signal constituting a reproducible, audible communication (7), which is fed back to said first microphone (1), together with a new original speech signal (5) and noise (9) existing in the area, said first microphone (1) and conversion means providing an electric signal (10); and an operative acoustic echo canceller system (15) using said electric signal (13) which will be reproduced and an electric signal (10) supplied by said first microphone comprising the feedback of said reproduced audible communication (7), a new existing, original existing speech signal (5) and other acoustic noise signals (9) existing in the area, whose system (15) is applied to eliminate the feedback of said audible communication (7) seized by said first microphone, characterized in that it integrates an assembly applied to an further additional filtering of the electric signal (11) after leaving said acoustic echo canceller system (15) comprising a two-step Wiener filter (16), a first (22) of them applied to the elimination of a possible residual echo that is not suppressed by the echo canceller system (15) and a second one (23) for carrying out the elimination of the noise in the area, whose two-step filter (16) is calculated by means of an estimate of the spectral power density of said residual echo and an estimate of the spectral power density of said noise, both existing in said signal (11).

* * * * *